Nov. 8, 1955  J. LEVITIN  2,722,738
CITRUS FRUIT PEELERS
Filed Dec. 10, 1953
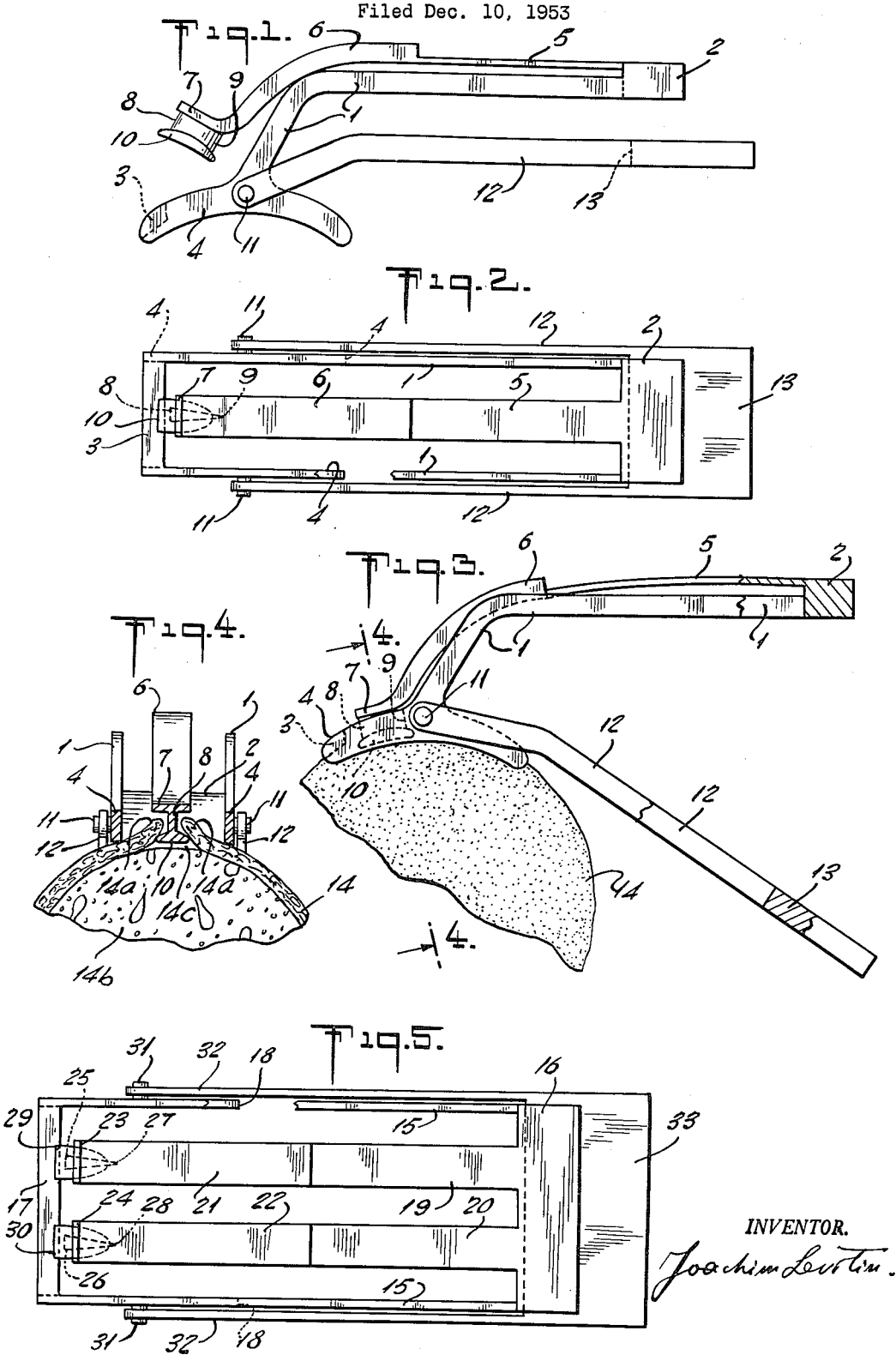
INVENTOR.
Joachim Levitin United States Patent Office 2,722,738
Patented Nov. 8, 1955

2,722,738
CITRUS FRUIT PEELERS
Joachim Levitin, New York, N. Y.
Application December 10, 1953, Serial No. 397,366
Claims priority, application Great Britain December 17, 1952
2 Claims. (Cl. 30—24)

The object of this invention is to provide improved constructions which will facilitate the peeling, particularly of oranges and grapefruit. It is related more particularly to those citrus fruit peeling devices which comprise in combination runner means mounted on the body for contacting the outer surface of the fruit and at least one self-adjusting peel cutting member, also mounted on the said body of the device. One feature of the present invention, namely, the handle part which has a degree of free movement independent of the body portion can obviously be applied to peelers of the types not mentioned in this specification.

The main object of this invention is related furthermore to the provision of a peel cutting element or elements which while cutting through the peel of a fruit do not affect or even contact the surface of the carpels covered by the said peel of the fruit. In accordance with this invention the self-adjusting peel cutting member comprises a peel cutter of a "crown" type which is attached to a resilient mounting means on the body of the peeler, the said resilient mounting means being such that the said peel cutter is movable at right angles to but not along the fruit-contacting surface of the runner means of the peeler. A peel cutter of the "crown" type comprises a peel cutting blade attached to its base, the free end of the peel cutter carrying a finger or plate-like extension, or a plate to form a right angle projection or shoulder which can engage the underside of the peel along one or both sides of the line of cut of the peel. In the process of peel cutting the runner means of the peeler glide in contact and along the surface of the fruit, the peel cutter blade cutting the peel, while the crown of the peel cutter lifts the side (or sides) of the peel formed by the cut. The lifting action of the crown peel cutter is assured and augmented by the resilient mounting means which are so arranged as to provide an upward tension or pressure against the underside of the peel by the crown of the peel cutter engaging the said underside of peel.

Another object of this invention is to provide a handle part to the body of the peeler such as will allow the said body of the peeler, and therefore the peel cutting element itself, to retain a constant orientation with respect to the surface of the fruit in the process of peel cutting. This feature is particularly relevant in citrus fruit peelers in which during the peel cutting operation the fruit is fixed in space but the peel cutter or cutters are made to revolve round the fruit. Obviously, if no such provision is made the peel cutting element may easily escape from the peel, or become so tilted as to make its progress while cutting the peel difficult.

In order that the invention may be more fully understood, two citrus fruit peeling or peel cutting devices designed according thereto are shown by way of examples in the accompanying drawings wherein:

Figure 1 shows a side elevation of a first embodiment.
Fig. 2 show a plan view of it.
Fig. 3 gives a side view showing the embodiment while cutting a peel of a fruit.
Fig. 4 shows a cross-section through the line 4—4 of Figure 3.
Fig. 5 shows a plan view of the second embodiment.

Referring first to Fig. 1 and Fig. 2, the embodiment shown comprises a body portion or a frame-work of which 1, 1 are the side-walls or side bars, 2 is the back cross-bar, and 3 is the front cross-bar. 4, 4 are two runners the front ends of which are joined by the front cross-bar 3, the back ends or fingers being free. 11, 11 are two pins each projecting from its corresponding side-wall near the runner underside or arc which serve as axles to the handle bars. The back cross-bar 2 carries a resilient peel cutting element comprising an arm the thin portion 5 of which serves as a spring and the thick portion 6 as a carrier of the peel cutter projecting from its base 7, the peel cutter comprising a peel cutting blade 8, with its cutting edge 9, to the free end of which is attached at right angles a "crown" in the form of an arcuate plate 10.

The handle portion of the peeler comprises two arms 12 joined by a cross-bar 13, the front free ends of the arms 12 being provided with openings in which their corresponding pins 11, 11 can rotate freely.

Fig. 3 and Fig. 4 show the peeler cutting the peel 14 of the fruit. It will be seen that peel cutter is pressed down, the spring portion 5 of the arm being bent downwards to provide the upward tension, the peel cutter being held in its position by its crown 10 which is under the peel 14 of the fruit. It will be seen more clearly in Fig. 4 that the two portions of the peel cut by the blade 8 are lifted by the crown 10 so that each peel side or lip 14a together with the underside of the crown 10 form a cavity 14c, the crown 10 being clear of the inner core or segments of the fruit marked 14b. Obviously, the upward pressure provided by the spring must not be too great its limit being determined by the mechanical properties of the peel, the sides or lips of which must hold the crown down without being broken or completely curled up by the upward pressure of the crown of the peel cutter.

Fig. 5 shows a modification of the embodiment shown in Figures 1 to 4, the essential difference of this second embodiment being the provision of two peel cutting elements of the resilient type which are disposed in transversely spaced positions with reference to the direction of cutting to produce simultaneously parallel cuts which mark in the peel of a fruit at least one strip of constant width, or which lift such a strip from the underlying carpels of the fruit. A side view or an elevation of this embodiment would be similar to that shown in Fig. 1; when engaged under the peel of the fruit the crowns of the peel cutters press the peel upwards, that is, away from the centre of the fruit, the necessary tension being provided by the displacement of the thin portions of the arms carrying the peel cutters, said thin portions acting as springs. Thus, the embodiment shown in Fig. 5 comprises a framework with side-walls 15, 15, the back cross-bar 16, and the front cross-bar 17. The runners 18 have their front ends joined by the bar 17 their back ends or fingers being free. Two pins 31 project from their corresponding side-walls, each disposed near the runner underside serving as an axle to its corresponding arm 32 of the handle part, the two arms 32 of said handle part being joined by the bar 33. The back cross-bar 16 carries two resilient peel cutting elements comprising two arms each having its thin portion 19, 20 which serves as spring, and thick portion 21, 22 which serves as carrier of its corresponding peel cutter; the peel cutters project respectively from their corresponding bases 23, 24, and comprise respectively cutting blades 25, 26, with cutting edges 27, 28, and the arcuate plates or "crowns" 29, 30.

It will be obvious that in both embodiments peel cutters must be pressed down initially in order to engage with the underside of the peel after the crown or crowns have penetrated said peel. When the said initial engagement is effected the peel itself takes over the upward pressure caused by the deflected spring of each peel cutter's arm.

It will also be clear that the upward tension may be provided by a coiled spring which would be initially extended to engage the crown with the underside of the peel, and in this extended condition would provide the necessary upward tension or pressure.

The two embodiments as illustrated are made of the same material such as plastics of polystyrene or cellulose acetate or of urea types. This, of course is not always necessary; thus springs may be made of metal, so can peel cutters, or only the cutting blades.

The handle part and the body part of the peelers as illustrated may be manufactured as two separate pieces which are assembled.

Obviously also a peel cutter or cutters with cutting blades and crowns which are actuated in an upward direction with reference to the centre of a fruit by springs pulling them upwards may be made a part of any citrus fruit peeling or peel cutting machine.

I claim:

1. A peeling device for citrus fruits comprising in combination a body portion, runner means to contact the outer surface of the fruit, resilient mounting means on the body portion to carry peel cutting means formed by a peel cutting blade which carries at its free end a sideways projection to engage the underside of the peel, said resilient mounting means being such as to pull the said sideways projection and the portions of the peel which it engages upwards with reference to the centre of the fruit in the process of peel cutting.

2. A peeling device for citrus fruits comprising in combination a body portion, runner means to contact the outer surface of the fruit, resilient mounting means on the body portion to carry peel cutting means formed by two peel cutting blades in transversely spaced positions with reference to the direction of cutting, each of the said peel cutting blades carrying at its free end a sideways projection to engage the underside of the peel, said blade being mounted on its own resilient mounting means such as to pull the said sideways projection and the portions of the peel which it engages upwards with reference to the centre of the fruit in the process of peel cutting.

References Cited in the file of this patent
UNITED STATES PATENTS
518,501   Hale _____ Apr. 17, 1894